W. H. MUZZY.
COMBINATION CASH REGISTER AND SCALE.
APPLICATION FILED AUG. 3, 1907.
1,117,224.
Patented Nov. 17, 1914.
4 SHEETS—SHEET 1.
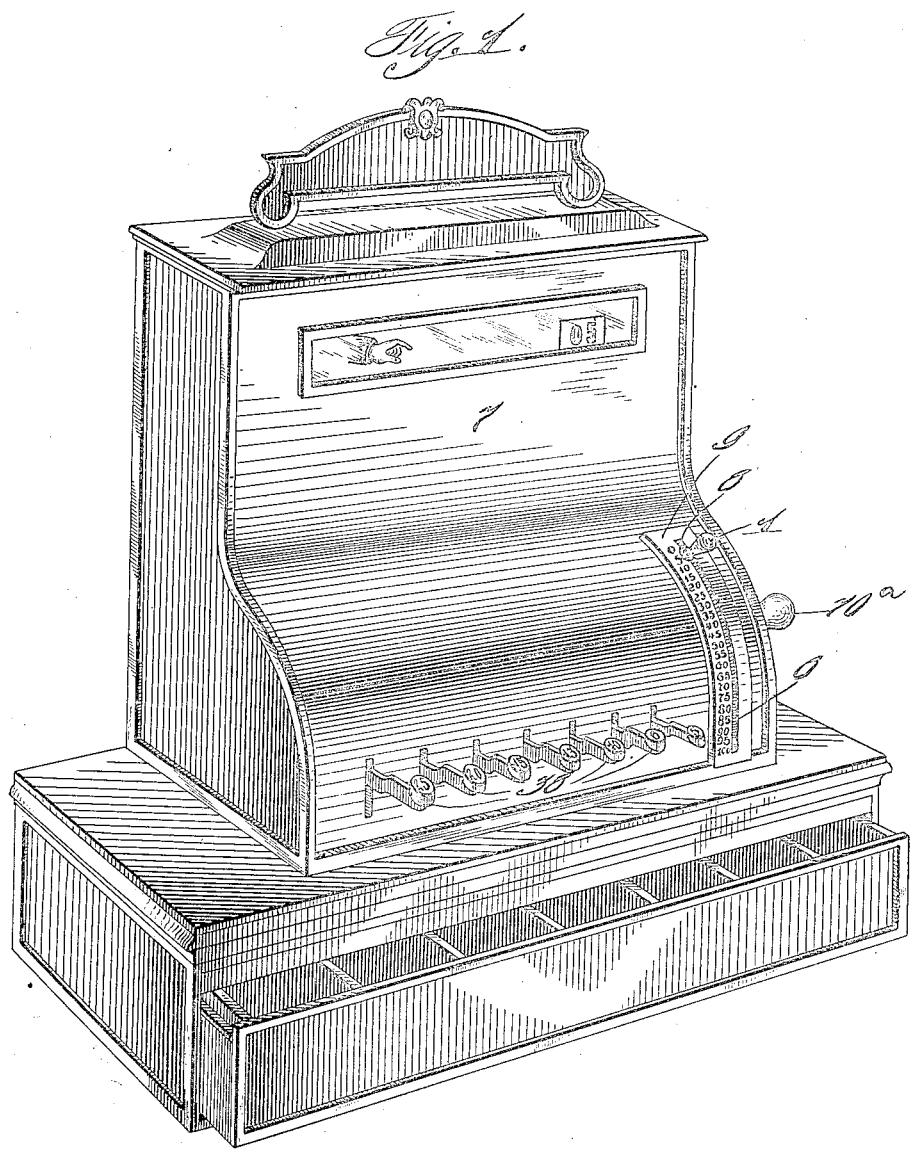

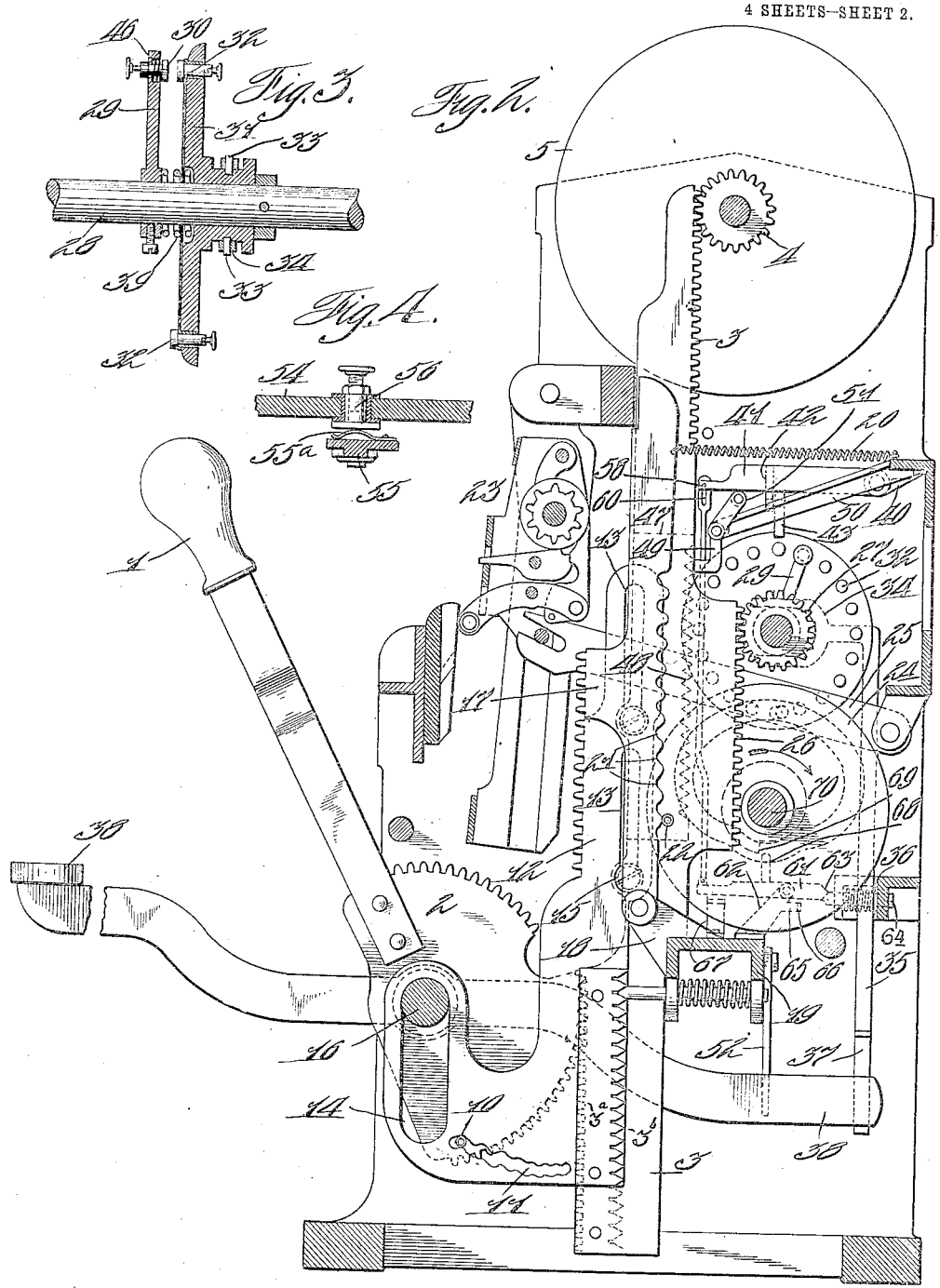

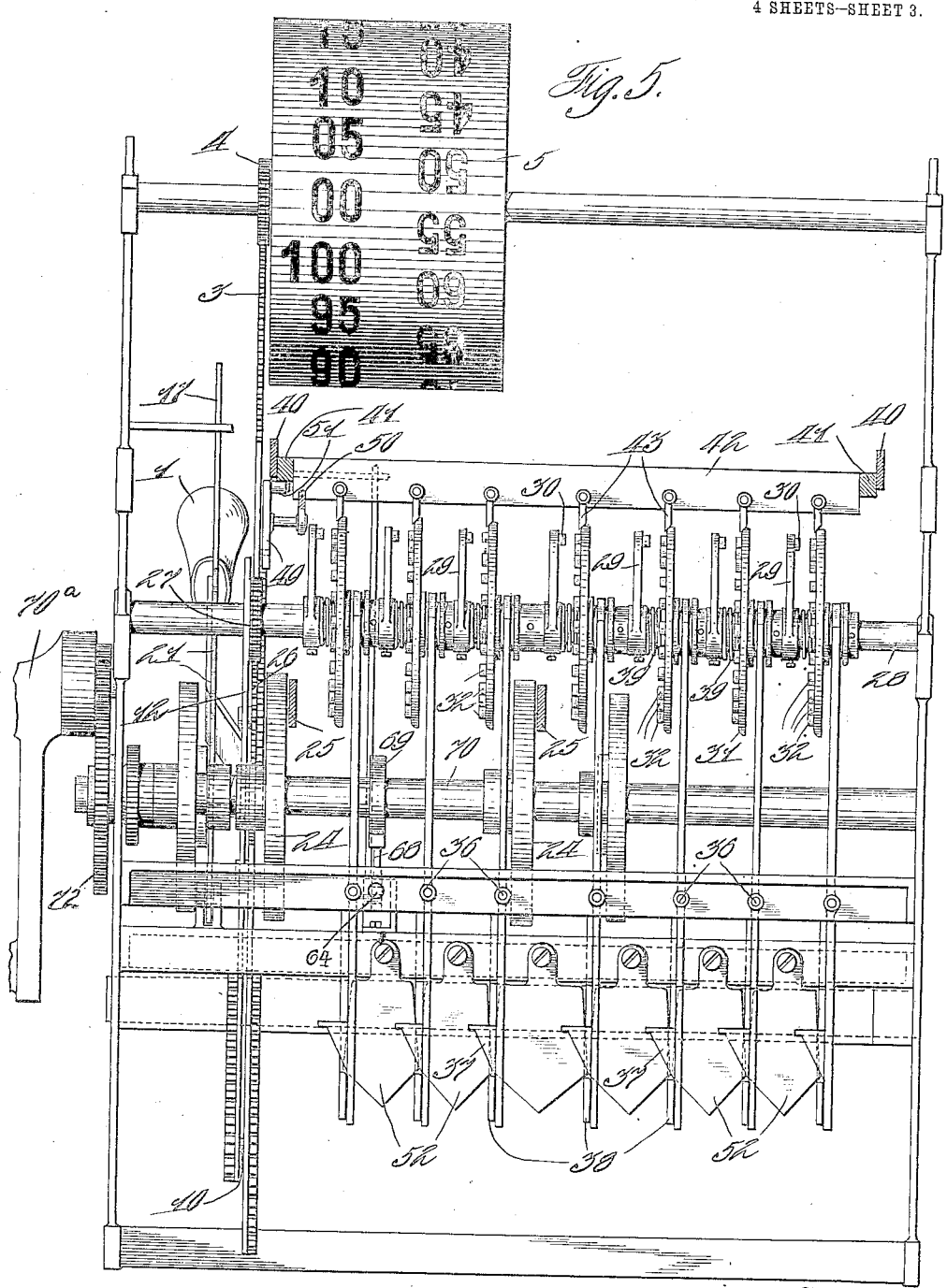

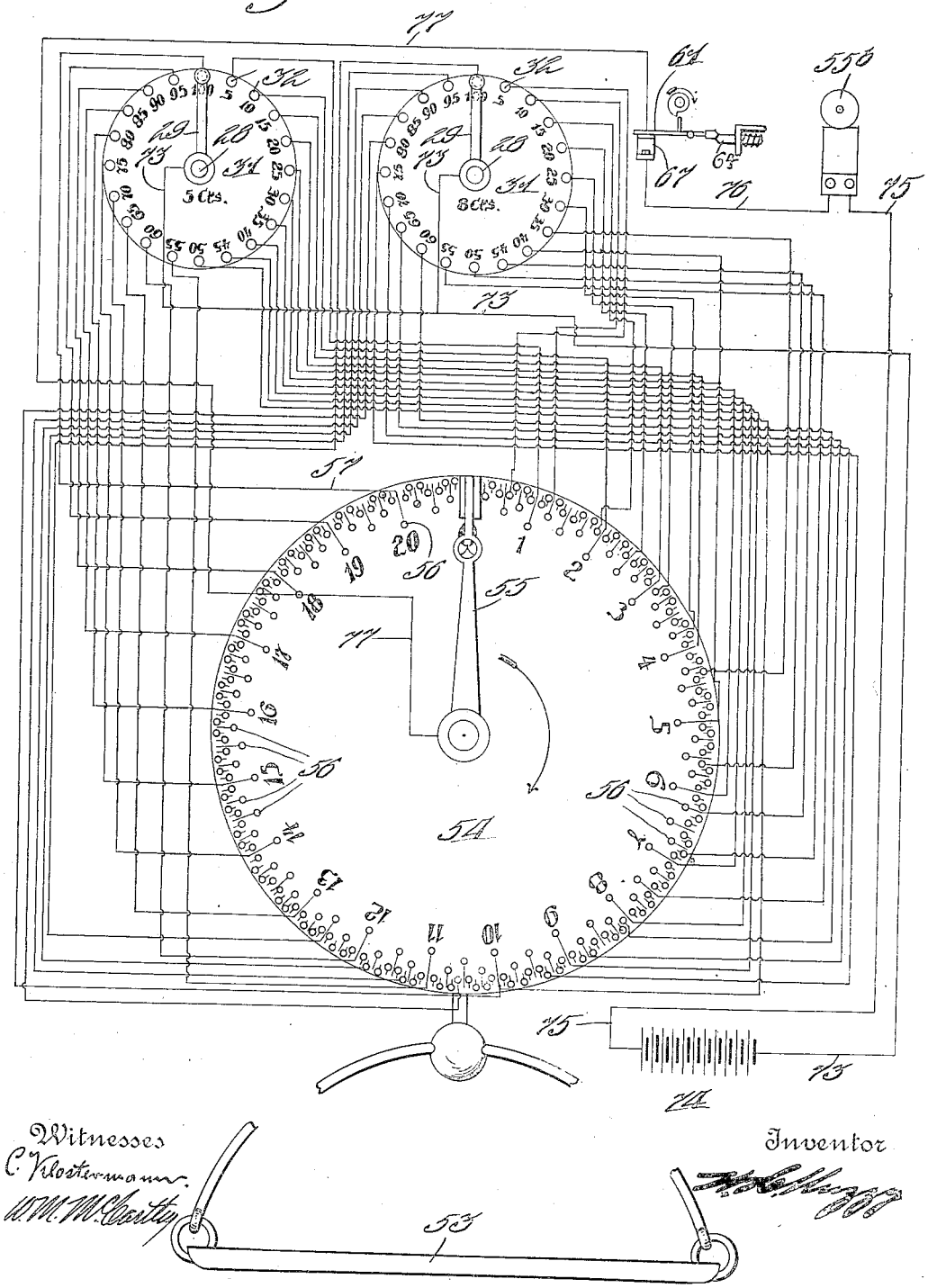

UNITED STATES PATENT OFFICE.

WILLIAM H. MUZZY, OF DAYTON, OHIO, ASSIGNOR TO THE NATIONAL CASH REGISTER COMPANY, OF DAYTON, OHIO, A CORPORATION OF OHIO, (INCORPORATED IN 1906.)

COMBINATION CASH-REGISTER AND SCALE.

1,117,224.   Specification of Letters Patent.   Patented Nov. 17, 1914.

Application filed August 3, 1907. Serial No. 386,854.

*To all whom it may concern:*

Be it known that I, WILLIAM H. MUZZY, a citizen of the United States, residing at Dayton, in the county of Montgomery and State of Ohio, have invented certain new and useful Improvements in Combination Cash-Registers and Scales, of which I declare the following to be a full, clear, and exact description.

This invention relates to improvements in cash registers and has more particular relation to improvements in combination registers and scales.

The object of the invention is to provide a mechanism whereby the amount of the sale being determined and the rate per unit, a signal will be given the operator when the proper quantity of the article being weighed has been placed on the scale.

A further object of the invention is to provide a mechanism in connection with a combination scale and register to compel the registration of the amount of the sale before the customer or operator can ascertain if the proper amount has been weighed.

With these and incidental objects in view, the invention consists in certain novel features of construction and combinations of parts, the essential elements of which are set forth in appended claims and a preferred form of embodiment of which is hereinafter specifically described with reference to the drawings which accompany and form part of this specification.

Of said drawings: Figure 1, represents a perspective view of the cash register forming a part of the present invention. Fig. 2, represents a vertical section through the same. Fig. 3, represents a detail vertical section through one of the commutator sets. Fig. 4, represents a fragmentary view of a portion of the scale dial and pointer. Fig. 5, represents a rear elevation of the devices embodying my invention; and Fig. 6, represents a front elevation of a scale showing the electrical connections with the register in diagram.

In a large number of stores at the present time, the customers have acquired the habit of asking for as much of certain articles as they can purchase for a given amount of money. For instance; it is a common request in grocery stores to say: "Please give me a dollar's worth of sugar," or some other article. In other words, the customer knows the rate per unit of the commodity, but does not care to stop to figure up just how many pounds he should receive. This is particularly applicable to the smaller stores doing a credit business limited to small accounts. The present invention is designed to take care automatically of requests of this nature. The register may be used by itself. The scale may also be used by itself, but if, at any time, it is desired to have the machine calculate just how much of any particular article should be given for a certain amount of money, this can be instantly done. To accomplish this result in the present instance, I provide a lever which when set to the amount which it is desired to spend, will set the accounting mechanism herein shown as a totaling or registering device to register a corresponding amount when the handle of the machine is operated. One of a series of keys is then operated according to the rate per unit of the article, the crank handle of the register is then turned, the article being weighed is then placed on the scale, a small quantity at a time until the proper amount has been weighed, when a signal will be given the operator and he will know that the proper number of units, according to the amount registered has been weighed. In the present instance this signal is in the form of a bell which starts to ring immediately when the proper weight is reached.

The register forming a part of my invention is of a type shown in the patent to Thomas Carroll, No. 773,053, granted Oct. 25, 1904, while the scale is of an ordinary spring balance type.

Referring to Fig. 2, it will be seen that the setting lever 1 is fastened at its inner end to a segmental rack plate 2 which meshes with gear teeth 3ª the lower end of a vertical rack plate 3, the upper end of which engages a pinion 4 secured to an indicator 5, which is arranged to display the amount of the purchase at the front and back of the machine. The rack plate 3 is alined in its various settings by a spring actuated plunger co-acting with V shaped notches 3ᵇ in a plate fast to plate 3 as shown in Fig. 2.

The lever 1 as shown in Fig. 1 plays through a slot 6 formed in the cabinet 7 of the machine, and is provided with a pointer 8 which extends alongside the numerals formed upon the index plate 9 secured to the cabinet 7. This plate is provided with numerals from 0 to $1.00 in multiples of five which is also true of the indicator 5.

A pin 10, see Fig. 2, mounted upon the segment 2 plays in zig-zag cam slot 11 formed in the lower end of a registering rack plate 12. This plate is provided with elongated slots 13 and 14 through which extend pins 15 secured to the rack plate 3 and a transverse shaft 16 respectively. By means of these slots, pins and shaft, the plate 12 is guided in its upward movement. The shape of the cam groove 11 is such that the plate 12 is only moved upward when the setting lever 1 is moved to a position representing a multiple of ten.

The odd multiples of five are registered in the following manner: A rack plate 17 is pivoted at its lower end to a projection 18 extending from a tie bar 19. This rack is drawn rearwardly by a coil spring 20 one end of which is fastened to the upper end of the rack and the other end to a pin secured to the back frame of the machine. The rear side of the rack plate 17 is provided with a series of notches 21 in which plays a pin 22 projecting from the rack plate 3. The relation between the pin 22 and the notches 21 is such that when the lever 1 is moved to an odd multiple of five the pin and notches are out of alinement so that the rack plate 17 is held forward against the tension of the spring 20. When the lever 1 is at a multiple of ten the rack 17 is drawn rearwardly so that the counter 23 in the downward movement given to it by the cam disks 24 and arms 25 will not be actuated by said rack. This rack is provided with five teeth so that when it is in a position to actuate the units wheel of the counter, it will turn said wheel five spaces or a half revolution.

The rack bar 12 which is moved upon every alternate five cent step of movement of the setting lever 1, is provided with a sufficient number of teeth to give the tens wheel of the counter a complete revolution when the setting lever 1 is occupying the dollar position and the counter moved downwardly. Suitable transfer mechanism is provided so that upon a complete revolution of a wheel one will be added to the wheel of the next higher denomination.

The rack bar 3 is provided with an additional set of teeth 26 upon its rear side which mesh with a pinion 27 secured to a transverse shaft 28. Fastened to this shaft is a series of arms 29, each one carrying a contact plunger 30 at its outer end, see Fig. 3. Loosely mounted upon the shaft 28 but held from rotation therewith and adjacent to the arms 29 are a series of disks 31 one for each arm 29. Each disk is provided with twenty contact posts 32, any one of which the contact plunger 30 may be brought into engagement with. Each disk 31 is provided with a collar into which project two pins 33 from the upper bifurcated end 34 of an arm 35 which is pivoted at 36 to the back frame of the machine, see Figs. 2 and 5. The pins 33 prevent rotary movement of the disks 31 while at the same time they are used to shift said disks laterally. The lower ends of the arms 36 are beveled as at 37, see Fig. 5, and these beveled ends are arranged to be engaged by the rear ends of the rate per unit keys 38 which are pivoted upon the transverse shaft 16 with their front ends extending through the cabinet 7 as shown in Fig. 1.

It will be seen by reference to Fig. 5 that when the rear end of any one of the keys 38 is raised, it will cam the end 37 of the arm 36 to the right thereby swinging the bifurcated upper end and its companion disk 31 to the left against the tension of a spring 39 which surrounds the shaft 28 and normally holds the contact plunger 30 of the arm 29 out of contact with the posts 32 of the disk 31. There is one of these springs 39 for each arm 29 and its companion disk 31.

Extending inwardly from the back frame are projections 40, see Fig. 2, to which are pivoted two forwardly extending arms 41 which support a transverse bar 42. This bar carries a series of pendent arms 43 having their lower ends beveled. When any disk is shifted as above described, it will contact with its arm 43 and rock the frame by elevating the bar 42. After the disk passes under the arm 43, the frame again drops into place, locking the disk in position. Should the depression of another "amount per pound" key be attempted, the rocking upward of the frame 41 will separate the contact lever 61 and contact 67 and thus prevent the sounding of the signal until after the register is again operated. This construction prevents the repeating of transactions without registration.

When the operator removes his finger from the rate per unit key, it returns immediately to normal position and the disk 31 settles back against its pawl. In order to allow this settling back of the disk and at the same time to prevent the breaking of the contact between the plunger 30 and the post 32, the spring 46 surrounding said plunger is slightly compressed when the key is fully depressed, which when the disk settles back, expands again, thereby holding the post and the plunger in contact as long as the arm 43 remains on the side of the disk 31 opposite to that shown in Fig. 5.

When it is desired to register another sale the setting lever 1 is moved and by this movement the displaced disk is released and its spring 39 returns it to normal position by the following means: Fastened to the side of the rack plate 3, is a plate 47 shown in dotted lines in Fig. 2, which is provided at its rear side with V shaped notches 48, corresponding in number to the positions occupied by the lever 1. Resting in the second notch from the upper end is the lower end of a pawl 49 which is pivoted to the forward end of an arm 50 projecting from the back frame. The upper end of the pawl 49 is provided with a roller 51 which bears on the under side of one of the arms 41. It will be seen from this that when the rack bar is moved in either direction by the lever 1, the pawl 49 will be rocked about its pivot carrying the side arms 41, and the transverse bar 42 upwardly. The arms 43 being secured to the bar 42 will also be elevated thereby releasing any of the disks 31 that may have been latched. A series of key stops 52, as shown in Fig. 5, are provided to prevent the depressing of more than one key at the same time. As this form of key stops is well known in the art, it is not thought necessary to describe them further.

As before mentioned, the scale is of an ordinary spring balance type and is provided with a pan 53 and a dial 54. A pointer 55 is pivoted in the center of said dial and is arranged to be rotated as the pan is lowered by the weight of the article placed thereon. The dial is divided into twenty-one divisions and each division is subdivided into twelve smaller divisions. Each main and subdivision is provided with a contact post 56 from which a wire 57 runs to its corresponding contact post 32 on the disks 31 located within the register.

A leaf spring 55$^a$, see Fig. 4, secured to the outer end of the pointer 55 is arranged to wipe over all of the contact posts 56 as the dial is rotated and when it strikes a contact 56 whose wire 57 is connected to a post 32 of one of the disks 31 which is in contact with the plunger 30 of one of the arms 29, a bell 55$^b$ is rung, see Fig. 6.

When the arms 41 are raised by the movement of the lever 1 as before described, a pin 58 projecting from one of the arms 41 raises a link 59, see Fig. 2, by engaging the upper end of an elongated slot 60 formed in said link. The lower end of this link is secured to the forward end of a contact pawl 61 which is pivoted to an arm 62 projecting upwardly from the tie bar 19. The rear end of the pawl 61 is beveled in opposite directions as at 63 and engaging with this beveled end is a spring pressed plunger 64 which prevents the accidental movement of said pawl from either of its adjusted positions. Extending rearwardly from the arm 62 is a projection 65 equipped with a laterally extending flange 66 which limits the movement of the pawl 61 in one direction. A contact block 67 mounted on the tie bar 19 is normally in engagement with the contact pawl 61. It will be seen from the above that when the setting lever 1 is moved, it will raise the arms 41 thereby releasing the latched disk and also breaking the contact between the pawl 61 and the block 67. A pin 68 extending upwardly from the pawl 61 moves into the path of a cam 69, fast upon a rotary shaft 70, when the contact between the pawl and block is broken, so that when the shaft 70 is rotated by the operating crank 70$^a$ and gearing 72, the pawl 61 will be cammed back into contact with the block 67 as shown in Fig. 2.

Having thus described in detail, the different parts of my invention, its mode of operation will now be described in general terms: Upon a customer asking for a dollar's worth of sugar, at a price of five cents per pound the operator moves the lever 1 opposite the dollar mark upon the index plate 9, which movement raises the rack 3 and rotates the indicator 5 so it will show one dollar at both the front and the back of the machine. This movement of the lever 1 will also raise the rack plate 12 a distance of ten teeth by the pin 10 and the slot 11, so that when the totalizer 23 is lowered, as described in the Carroll patent to which reference was made, the tens wheel of said totalizer will be given a complete revolution thereby tripping the transfer pawl for the dollar wheel, and as the totalizer is returned, the dollar wheel will be moved one space. The pin 22 projecting from the plate 3 will at that time be in one of the notches 21 of the rack plate 17, so that this plate will not actuate the units wheel of the counter when the latter is lowered. The upward movement of the rack plate will rock the pawl 49 so as to raise the arms 41 and the arms 43 to release any latched disk. As the left-hand one of the arms 41 (looking from the rear) is raised, a pin 58 carried thereby will raise the link 59 which in turn will rock the pawl 61 to break the contact with block 67. The elevation of the rack plate 3 will also rotate the shaft 28 carrying the arms 29, by means of the teeth 26 on said plate and the pinion 27 secured to the shaft 28, thereby bringing the plungers 30 in the arms 29 opposite the dollar contact posts 32 of the disks 31. Now upon depressing the rate per unit key 38, which in this case is five cents, it will rock the arm 35 thereby sliding the five cent disk to the left, see Fig. 5, which will be latched in this position by one of the arms 43 with the dollar contact post 32 in contact with the plunger 30, while the key 38 is free to return to its normal position. If the sugar is now placed on the scale, no alarm will be sounded on account of the contact between the pawl 61 and the post 67 being broken. As this contact can only be made by the rotation of the shaft 70, it will be seen that an operation of the accounting mechanism is required before the alarm can be sounded. After having operated the crank 70ᵃ to produce this operation, the sugar is placed upon the scale pan and when the spring 55ᵃ on the pointer 55 touches the contact post 56 of the twenty pound division of the dial 54, the circuit will be completed in the following manner it being remembered that the contact 61—67 is closed by the operation of the crank 70ᵃ: from the post 56, through wire 57 to the dollar contact post 32 of the five cent disk 31, through the arm 29, wire 73, to the battery 74, wire 75, bell 55ᵇ, wire 76, block 67, pawl 61, thence to the contact post 56, by means of the wire 77, pointer 55 and the spring 55ᵃ.

Each main division of the scale being subdivided into twelfths, it sometimes happens that the amount of the purchase is not exactly divisible into twelfths by the price per pound. For example: If a customer desires fifteen cents' worth of an article, the price per pound of which is eight cents, the bell should ring when the pointer passes between the ten and eleven twelfths of the second main division of the scale dial, but as there is no contact between said subdivisions, the bell will not ring until the pointer reaches the eleven twelfths contact, with which the wire running from the fifteen cents contact post of the eight cents disk is connected. In some instances, as in the above, the wires are connected to the scale contacts just beyond the proper weight and in other instances, just below. These variations on the average offset each other, and they are now of daily occurrence to users of computing scales unless they are exceedingly careful.

It will be seen from the above that should a careless clerk place too much of the commodity on the scale, that the bell will only ring for an instant and he will be compelled to remove the excess weight in order to cause the bell to ring long enough to show that the scale has come to a balance at the proper point. The proprietor, his fellow clerks and the customer will thus know that the proper weight has been given according to the amount of cash to be expended. The calculation is absolutely automatic and the clerk or operator has nothing to compute whatever, he simply sets up the amount which the customer wishes to spend and the price of the article per pound, the ringing of the bell then informs him that the proper amount has been weighed. It will be further seen that after the clerk has set up the amount of the purchase and the price per pound, he is compelled to operate the crank handle and thus complete the operation of the accounting mechanism, as otherwise the circuit will not be completed and the bell will not be sounded at all.

While I have shown one form of contact maker to be set up by the registering lever and the rate per unit keys, I wish it understood that this is only one of many forms that may be employed to secure the same results and the present invention is not limited in any respect to this particular form. It will also be understood that I do not limit myself to a combination with a scale of a registering device or mechanism as the amount setting lever may, if desired, control any form of accounting mechanism whether it be an indicator, a printer, a register or any similar mechanism.

The accounting mechanism shown in the present case takes the form of a totalizer or registering device, but, it will readily be understood that other equivalents in the art may be employed. It is further to be noted that some of the claims in the present case do not include the totalizer or registering mechanism and it will be evident that the machine would be operative and of value without the inclusion of this element, serving under such conditions as a computer though not retaining in the machine a record of the several transactions. With this mode of operation the setting of the handle 1 and operation of the rate per unit key 38 would be followed by the placing of the weights on the scale so that when the proper amount was placed on, the indicator would be actuated though no registration has taken place. It is preferred, however, to employ the totalizer or registering mechanism inasmuch as this retains in the machine a record of all the transactions and furnishes a more complete mechanism.

While the form of mechanism herein shown and described is admirably adapted to fulfil the objects primarily stated, it is to be understood that it is not intended to confine the invention to the one form of embodiment herein disclosed, for it is susceptible in various forms all coming within the scope of the claims which follow.

Having thus described my invention, what I claim as new and desire to secure by Letters Patent is:

1. In a machine of the class described, the combination with an accounting and a weighing device, of devices for designating the amount to be entered on the accounting mechanism, a signal, and connections for operating said signal controlled by said designating means and said weighing device.

2. In a machine of the class described, the combination with an accounting mechanism and a weighing device, of devices for designating the total amount to be entered on said accounting mechanism, rate per unit mechanism, a signal, and sets of connections actuating said signal, all controlled by said designating devices and said weighing device and each set being also controlled by a corresponding element of the rate per unit mechanism.

3. In a machine of the class described, the combination with an accounting mechanism, and a weighing device, of devices for designating the amount to be entered on said accounting mechanism, rate per unit mechanism, a signal, circuits for actuating said signal, and connections controlled by said rate per unit mechanism and said designating devices and finally controlled by said weighing device for closing one of said circuits.

4. In a machine of the class described, the combination with an accounting device, of controlling mechanism therefor, weighing mechanism, a price per pound device, connections intermediate said mechanisms and device, a signal, means for bringing said signal into action when the proper quantity has been placed on the weighing mechanism according to the cash amount of the transaction, and means controlled by the operation of the accounting device for preventing the operation of the signal until after the accounting device is operated.

5. In a machine of the class described, the combination with an accounting mechanism and a weighing mechanism, of devices for designating the total amount to be entered on said accounting mechanism, a signal, circuits for said signal controlled by said designating means, and devices actuated by said weighing mechanism for finally closing said circuits.

6. In a machine of the class described, the combination with a device for designating total amounts, of rate per unit devices, a weighing mechanism, a signal, circuits selectively controlled by said designating device and said rate per unit devices and including said signal, and an element moved by said weighing device constructed to close finally the circuit selected by the designating device.

7. In a machine of the class described, the combination with a device for designating total amounts, including rotary circuit selecting arms bearing contact points, of a plurality of series of contact points positioned to be swept over by said arms, a signal, circuits including said signal and said contact points, a weighing mechanism, and means controlled thereby for finally closing the circuit selected by one of the designating device arms.

8. In a machine of the class described, the combination with a device for designating total amounts, of rate per unit devices, a signal, signal controlling mechanism differentially positioned by said designating device, and independently controlled weighing mechanism, and means actuated by said weighing mechanism for actuating said signal controlling mechanism only after movement of said weighing mechanism to an extent determined by the signal controlling mechanism and the rate per unit devices.

9. In a machine of the class described, the combination with a totalizer and a weighing device, of an operating mechanism for the totalizer, manipulative means for determining the amount to be added to the totalizer, means controlled by said weighing device for indicating when the proper quantity has been weighed, and devices for preventing operation of said indicating means until the amount has been added to the totalizer.

10. In a machine of the class described, the combination with a totalizer and a scale, of an operating mechanism for said totalizer, manipulative means for determining the amount to be added to the totalizer, means controlled by the scale and including an electric circuit and a circuit closer for indicating when the proper amount has been weighed, and means actuated by said operating mechanism for closing the circuit closer.

11. In a machine of the class described, the combination with a totalizer and a scale, of an operating mechanism for said totalizer, manipulative means for determining the amount to be added on said totalizer, means controlled by said scale for indicating when the desired amount has been weighed, and means for rendering said indicating means ineffective until the operating mechanism has been actuated.

12. In a machine of the class described, the combination with a weighing mechanism including a series of electrical contacts for different weights, of a series of price per pound controlling devices provided with a plurality of contacts, electrical connections intermediate said contacts of the weighing mechanism and the price per pound devices and cash account determining devices also included in the electrical circuits whereby the live contacts of the weighing mechanism will correspond in amount to the quotient derived by dividing the value of the cash amount by the price per pound substantially as and for the purpose described.

13. In a machine of the class described, the combination with a weighing mechanism, of total price devices comprising a plurality of controlling means, rate per unit mechanisms with connections therefrom for rendering said controlling means separately effective, a signal, and connections for operating said signal controlled by said weighing mechanism and the effective controlling means of the total price devices.

14. In a machine of the class described, the combination with a weighing mechanism, of total price devices comprising a plurality of differentially adjustable arms, rate per unit mechanisms with connections for separately rendering said arms effective, a signal and devices controlled by said weighing mechanism and the effective arm of the total price devices for actuating said signal.

15. In a machine of the class described, the combination with a weighing mechanism including a contact device, of total price devices comprising a plurality of differentially adjustable contact arms, rate per unit mechanisms with connections for separately rendering said contact arms effective, a signal, and electrical connections including the contact device and said contact arms for actuating said signal.

16. In a machine of the class described, the combination with a weighing mechanism including a movable arm, of total price devices comprising a plurality of arms differentially adjustable as a whole, rate per unit mechanisms, controlling means separately moved by said rate per unit mechanisms to coöperate with said adjustable arms, a signal, and actuating devices for said signal controlled by said movable arm and said adjustable arms.

17. In a machine of the class described, the combination with a weighing mechanism, including a device movable in proportion to the weight employed, of total price devices comprising differentially adjustable manually operated controlling mechanisms, a signal, and actuating means therefor, controlled by the movable device of the weighing mechanism and the controlling mechanisms of the total price device.

18. In a machine of the class described, the combination with a weighing mechanism including a movable device, of a plurality of differentially adjustable arms, total price mechanism controlling the adjustment of said arms, a signal, and connections for actuating said signal controlled by both said movable device and said manually adjustable arms.

19. In a machine of the class described, the combination with a weighing mechanism, including a movable device, of differentially adjustable arms, total price mechanism controlling the adjustment of said arms, a signal, and a plurality of connections for operating said signal, said connections being constructed to be controlled by both said movable device and said adjustable arms, and each connection joining said device and one of said arms at points whose distances from the normal or zero position of said device and arms are in inverse ratio.

20. In a machine of the class described, the combination with a weighing mechanism, including a series of electrical contacts for different weights; of a plurality of movable rate per unit members carrying a series of electrical contacts for different total amounts; means for moving any one of said members; a plurality of rotary circuit selecting arms each bearing a contact point positioned to sweep over its corresponding series of contact points on the members; a signal; and circuits including said signal one of which is selected by one of the selecting arms and finally closed by said weighing mechanism.

21. In a machine of the class described, the combination with a device for designating total amounts, including a plurality of relatively movable circuit selecting arms; of a corresponding number of series of contact points, each positioned to be swept over by its respective arm; a signal; circuits including said signal and said contact points; a weighing mechanism; and means controlled thereby for finally closing the circuit selected by one of the designating device arms.

22. The combination with an accounting mechanism of the weighing mechanism; a rate per unit device; a signal; connections intermediate the said mechanisms and device, which include means for bringing said signal into action when the proper quantity has been placed on the weighing mechanism according to the cash amount of the transaction; means for preventing the operation of the signal until after the accounting mechanism is operated; and actuating means for said preventive means whereby said preventive means is rendered ineffective upon the operation of the machine.

In testimony whereof I affix my signature in the presence of two witnesses.

WILLIAM H. MUZZY.

Witnesses:
R. W. FAIRCHILD,
HOWARD S. SMITH.